Figure 1:
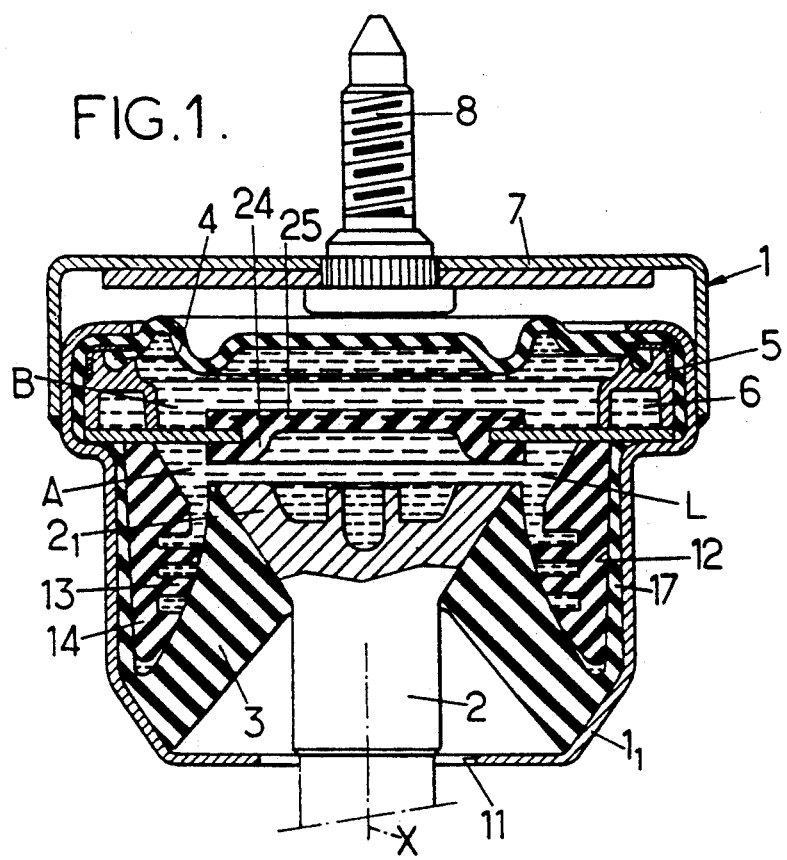

United States Patent [19]

Bretaudeau et al.

[11] Patent Number: 5,269,498
[45] Date of Patent: Dec. 14, 1993

[54] HYDRAULIC ANTI-VIBRATION DEVICES

[75] Inventors: Jean-Pierre Bretaudeau, Chateaudun; Philippe Lenormand, Oisseau le Petit; Daniel Gregoire, Chateaudun, all of France

[73] Assignee: Hutchinson, Paris, France

[21] Appl. No.: 804,329

[22] Filed: Dec. 10, 1991

[30] Foreign Application Priority Data

Dec. 12, 1990 [FR] France .................. 90 15565

[51] Int. Cl.⁵ .................................................. F16M 5/00
[52] U.S. Cl. .................................. 267/140.13; 267/35
[58] Field of Search .......... 267/140.11, 140.13, 267/219, 220, 35, 141.1–141.5; 188/315, 378; 248/562, 636; 280/710, 716

[56] References Cited

U.S. PATENT DOCUMENTS

| | | | |
|---|---|---|---|
| 4,079,585 | 10/1988 | Behrens et al. | 267/140.13 |
| 4,783,063 | 11/1988 | Probst et al. | 267/140.13 |
| 4,984,777 | 1/1991 | Kurr et al. | 267/140.13 |
| 5,024,461 | 6/1991 | Miyakawa et al. | 267/35 X |

FOREIGN PATENT DOCUMENTS

| | | | |
|---|---|---|---|
| 3207889 | 9/1983 | Fed. Rep. of Germany | 267/140.13 |
| 3-84244 | 4/1991 | Japan | 267/140.13 |

*Primary Examiner*—Robert J. Oberleitner
*Assistant Examiner*—Lee W. Young
*Attorney, Agent, or Firm*—Larson and Taylor

[57] ABSTRACT

The hydraulic anti-vibration device comprises: an annular rigid endpiece (1) about a vertical axis (X); a rigid stud disposed coaxially with the endpiece; a frustoconical annular wall (3) made of elastomer that withstands axial compression and that is interposed between the endpiece and the stud; a watertight flexible membrane (4); a rigid intermediate partition (5) dividing the assembly into a working chamber (A) and a compensation chamber (B); a throttled passage (6) between the chambers; and a mass of liquid (L) filling the chambers and the passage, the stud being disposed inside the working chamber and constituting the head ($2_1$) of a suspension rod (2), and the downwardly flared annular wall (3) extending upwards inside the bottom annular portion (12) of the working chamber. At least the bottom of said bottom annular portion is provided with at least one flexible blade-like obstacle (13).

8 Claims, 3 Drawing Sheets

HYDRAULIC ANTI-VIBRATION DEVICES

The invention relates to hydraulic anti-vibration devices for placing between two rigid elements such as a vehicle chassis and the engine of the vehicle for the purposes of damping and of connection or support.

More particularly, the invention relates to such devices that include:

a rigid endpiece annular about a vertical or substantially vertical axis X and a rigid stud coaxial with said endpiece, the endpiece and the stud being suitable for securing to respective ones of said two rigid elements to be connected together;

an annular wall made of elastomer about the axis X, that withstands axial compression and that is interposed between the endpiece and the stud;

a flexible and watertight membrane carried by the endpiece and co-operating with the endpiece, the stud, and the annular wall to delimit an enclosure;

an intermediate rigid partition carried by the endpiece and dividing the inside of the enclosure into two chambers, a "working" chamber adjacent to the wall, and a "compensation" chamber;

a throttled passage putting the two chambers permanently into communication with each other; and a mass of liquid filling both chambers and the throttled passage.

As is known, the effect of applying oscillations of relatively large amplitude (generally greater than 0.5 mm) and of relatively low frequency (generally about 5 Hz to about 20 Hz) to one of the endpiece and stud is to urge the liquid from one of the two chambers into the other and back again through the throttled passage, with the mass of liquid being displaced in this way resonating when the frequency of said oscillations reaches a predetermined value that is a function of the ratio between the axial length and the cross-section of the throttled passage, with such resonance ensuring excellent damping of the oscillations concerned.

Yet more particularly, the present invention relates to anti-vibration devices of the above kind that are of the "suspended" type in which the stud is disposed inside the working chamber and constitutes the head of a suspension rod itself disposed coaxially with the annular endpiece inside the bottom portion of said endpiece, the downwardly flared and preferably frustoconical annular wall thus constituting an upwardly re-entrant member inside the bottom annular portion of the working chamber.

Mounts of this type can be used for suspending a rigid assembly such as an engine disposed therebeneath and connected to their rods while still causing their elastomer annular walls to work in compression.

It should be observed that since said annular walls are deformable both radially and axially, the mounts in question are capable of transmitting vibration from the stud to the endpiece or vice versa both in radial directions and along the direction of the axis X.

In general, the transmission of vibrations that it is desired to control (and thus the desired damping) relates essentially to the axial direction.

The oscillations or vibrations that are transmitted radially are negligible and do not require special treatment.

This applies in particular when the frequency of such vibrations remains below a relatively low threshold, e.g. 165 Hz, which corresponds to a maximum speed of rotation for the shaft of a diesel engine of 5000 revolutions per minute (rpm).

If, other things remaining equal, the engine in question is replaced by a gasoline engine such that the maximum speed of rotation rises to 7000 rpm, which corresponds to vibration at a frequency of 230 Hz, it can happen that the radial components of such vibrations give rise to resonant phenomena that are not filtered sufficiently and that give rise to disagreeable noise.

It is then necessary to provide special means for reducing the level of such noise.

That constitutes the main object of the present invention.

To achieve this object, the present invention provides a hydraulic anti-vibration support of the kind in question which is essentially characterized in that at least the bottom of the bottom annular portion of its working chamber which surrounds the annular wall made of elastomer is provided with at least one flexible blade-like obstacle.

The effect of immersing such an obstacle in the liquid is to brake circumferential and radial displacements of the liquid about the axis of the mount, and even partially to prevent such displacements, thereby greatly attenuating undesirable radial resonances.

In particular embodiments of the invention, at least one of the following dispositions is also made use of:

the blade-like obstacle is constituted by a plurality of transverse parallel blades extending inwardly from a common cylindrical ring made of elastomer and forming together therewith an annular block whose outside shape is complementary to the shape of the annular portion of the working chamber in which it is received;

the blade-like obstacle is constituted by a single annular lip extending an elastomer cylindrical ring inwardly;

the blade-like obstacle is made up of a plurality of thin webs extending parallel to the axis of the mount, in particular along radial planes of it, and integrally molded with the annular wall;

the stud is secured to a disk overhanging radially into the working chamber and co-operating with the surrounding portion of the annular endpiece to delimit a throttled passage for the liquid; and in a hydraulic anti-vibration mount satisfying both preceding subparagraphs, the periphery of the disk is notched radially by notches suitable for surrounding the various thin webs with radial clearance.

Apart from the above main dispositions, the invention comprises certain other dispositions that are preferably used simultaneously therewith and that are described in greater detail below.

Several preferred embodiments of the invention are described below, naturally in non-limiting manner, and with reference to the accompanying drawings.

Figure 2:
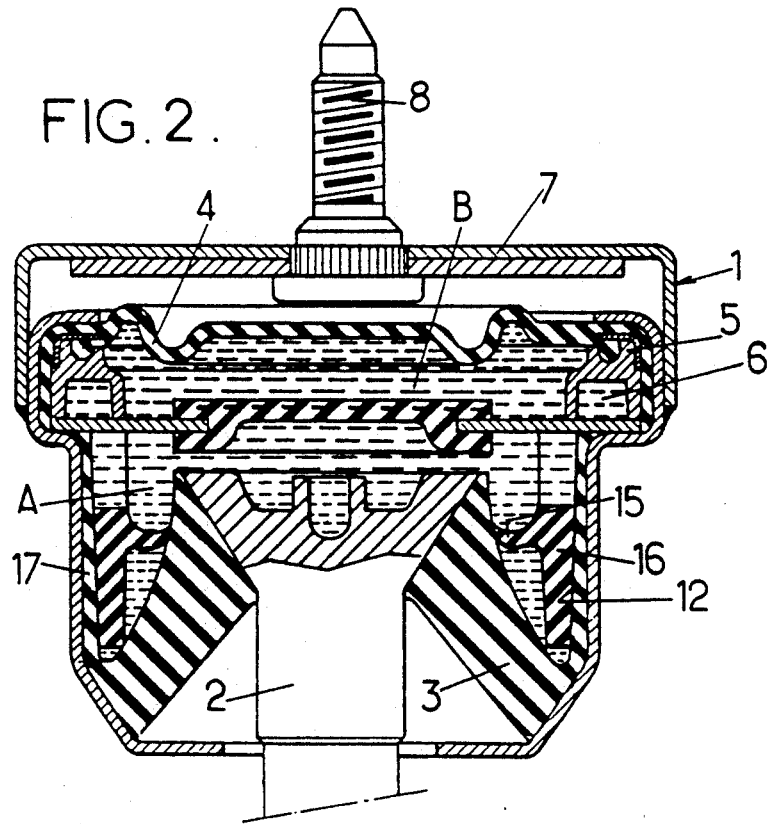
Figure 3:
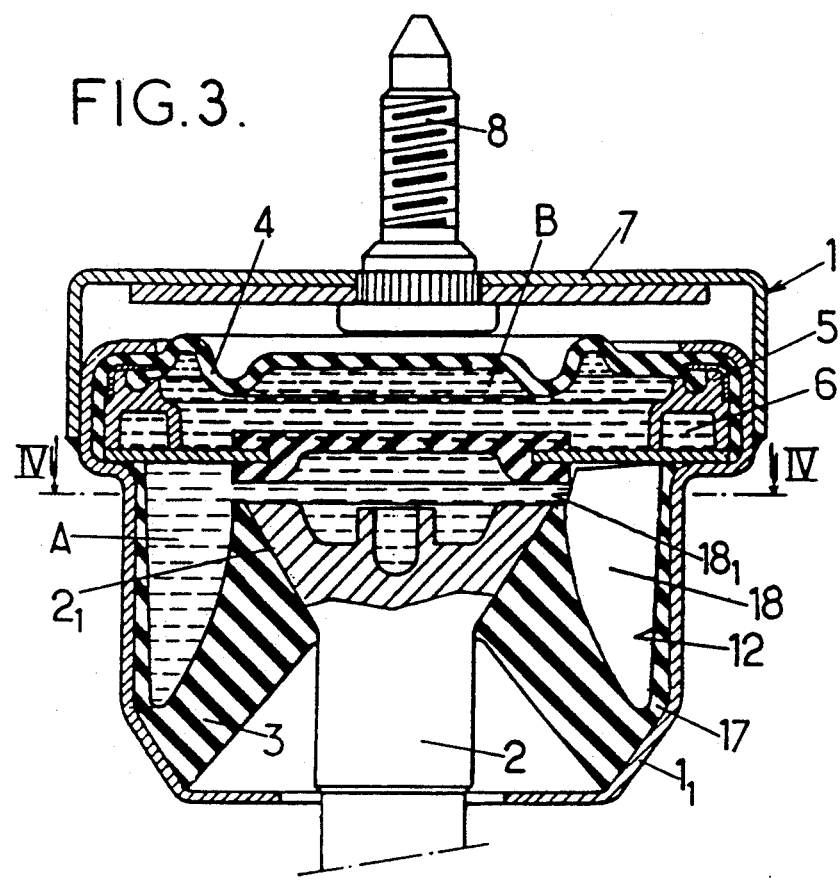
Figure 4:
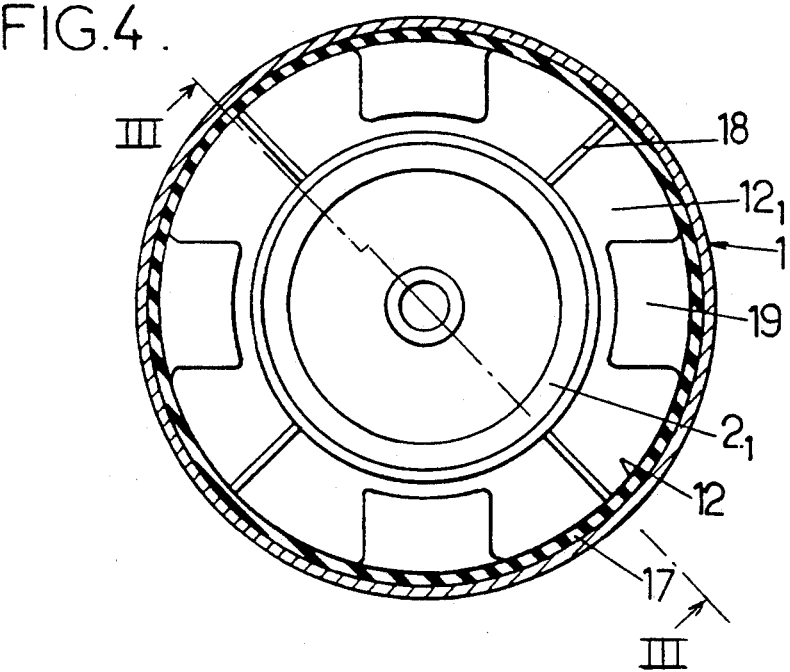
Figure 5:
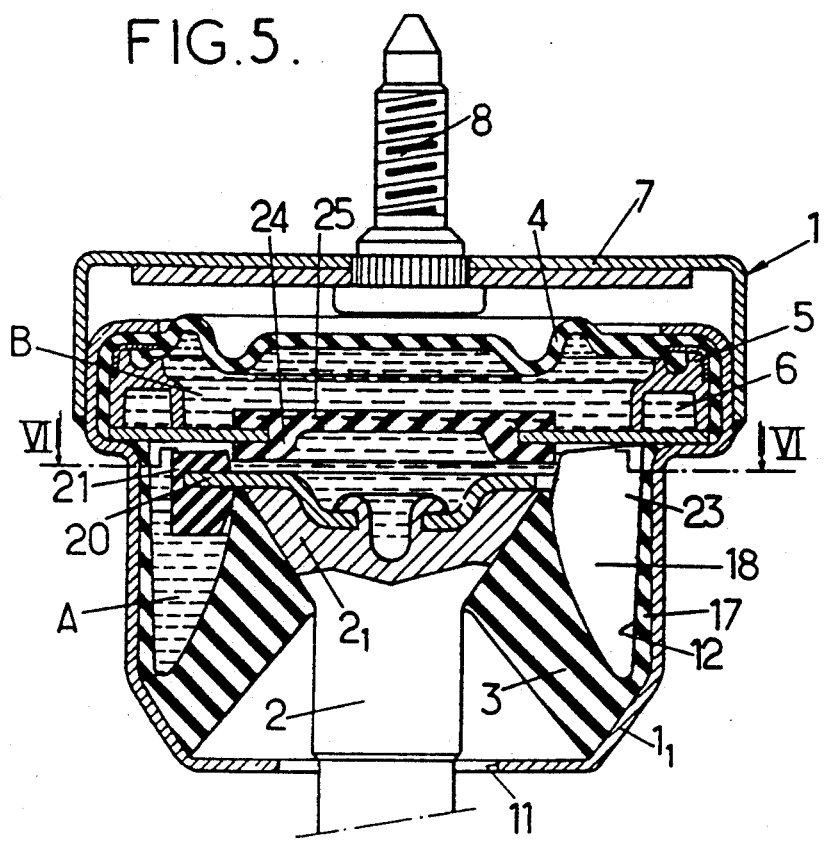
Figure 6:
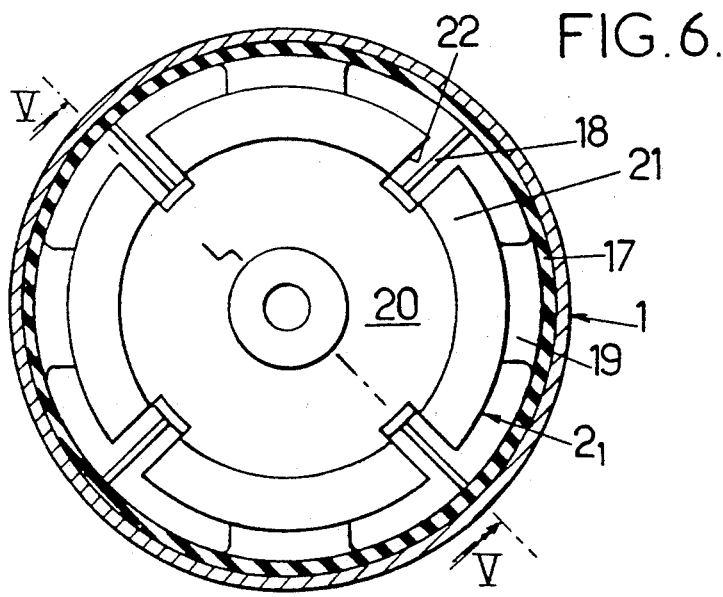

FIGS. 1, 2, 3, and 5 of the drawings are axial sections through four distinct embodiments of hydraulic anti-vibration mounts of the invention, with FIG. 3 being a cross-section on plane III—III of FIG. 4 and FIG. 5 being on a plane V—V of FIG. 6.

FIGS. 4 and 6 are cross-sections respectively through the embodiments of FIGS. 3 and 5 on the following planes respectively: IV—IV in FIG. 3, and VI—VI in FIG. 5.

In each case, the anti-vibration device comprises:

a rigid annular endpiece 1 having a vertical axis X and a coaxial central rod 2 with an enlarged head $2_1$ for fixing respectively to two rigid elements which are to be mounted relative to each other with mutual oscillations between them being damped, which elements may, for example, constitute parts respectively of a vehicle chassis and of an internal combustion engine for the vehicle;

a frustoconical wall 3 made of elastomer and disposed vertically between the endpiece 1 and the head $2_1$;

a liquid-tight and flexible membrane or bellows 4 mounted in sealed manner on the endpiece 1 so as to co-operate with the endpiece, with the wall 3, and with the head $2_1$ to form an enclosure;

a rigid intermediate partition 5 carried by the endpiece 1 and dividing the inside of the above enclosure into two chambers, a "working" chamber A adjacent to the wall 3 and a "compensation" chamber B; and a throttled passage 6 formed inside the partition 5 and permanently interconnecting the two chambers A and B.

A damping liquid L such as water containing antifreeze fills both the chambers A and B and also the passage 6.

The annular endpiece 1 is, in this case, in the form of a cylindrical sleeve whose top end constitutes a cap or protective cover 7 for the membrane and is fitted with an upwardly-extending bolt 8.

The base $1_1$ of the sleeve has a downwardly-tapering frustoconical shape and its bottom is extended by an inwardly-directed transverse rim with a central hole 11 through which the rod 2 passes with clearance, but that is too small to pass the head $2_1$ of the rod.

This constitutes a safety measure so that in the event of the frustoconical wall 3 being destroyed or crushed, then the head $2_1$ comes into abutment against the edges of the hole 11 which prevent the rod 3 being extracted downwardly.

The frustoconical wall 3 referred to below as the "cone" connects the bottom frustoconical inside face of lense $1_1$ of the sleeve 1 to the upwardly flared outside face of the head $2_1$.

In other words, the wall 3 constitutes a re-entrant shape inside the mount converging towards the center thereof.

The re-entrant assembly or "projection" formed by the cone 3 and the head $2_1$ is then surrounded by the annular base of the working chamber A, which base is in the form of an annular trough 12.

In conventional embodiments, the annular trough 12 has no obstacles therein and it is occupied solely by the liquid L.

Flow of the volume of liquid L contained in said trough 12 around the projection 3, $2_1$ is thus completely free and experience shows that under certain circumstances this volume can be subjected to resonant phenomena because of relative radial vibration imparted to the rod 2, with such resonant phenomena generating disagreeable noise.

To eliminate these phenomena, or at least to reduce them to an extent such that they are no longer objectionable, obstacles are placed in the annular trough 12 for the purpose of braking the flow of the liquid L.

These obstacles immersed in the liquid L must be shaped and disposed in such a manner as to satisfy the following conditions simultaneously:

they must brake both radial and circumferential components in the liquid flow, but they must not prevent such flow completely, particularly in the axial direction;

they must not significantly alter the radial stiffness of the resilient cone 3; and like the liquid, their total volume must remain constant.

In the embodiments that satisfy these various requirements, the obstacles under consideration include at least one rubber blade, i.e. a relatively thin deformable web or membrane having both faces immersed in the liquid.

In a first embodiment shown in FIG. 1, the above obstacles are constituted by a plurality of transverse flat blades 13, i.e. blades that extend perpendicularly to the axis X and that form kinds of parallel fins that project from the inside face of a single cylindrical ring 14.

The overall outside shape of the resulting finned block 13,14 is substantially complementary to the shape of the trough 12 so that it can be received therein with substantially uninterrupted contact therebetween.

As can be seen in FIG. 1, the inside circular edges of some of the fins 13 then come into contact with the outside face of the cone 3, thus having the effect of shutting off a number of annular grooves which are delimited between pairs of adjacent blades or fins.

To ensure that all of the annular cavities formed in this way are completely filled with the liquid L, the finned block 13,14 is inserted into the trough 12 "underwater" i.e. when the entire assembly is immersed in a tank filled with damping liquid L.

The resilient material from which the finned block 13,14 is made must be soft enough to ensure that neither the axial nor the radial deformations of the cone 3 are impeded.

This first embodiment has the advantage of reducing the volume of liquid L in displacement and of providing a large contact area with the liquid both in the radial direction and in the circumferential direction which corresponds to the largest displacements of said liquid. However, the finned block cannot be manufactured in one piece by molding: it must be molded as two halves which are then assembled together, and this constitutes a drawback in mass production.

The second embodiment shown in FIG. 2 avoids this drawback.

In this embodiment, the above multiple blades or fins 13 are replaced by a single annular and transverse lip 15 which projects from the inside of a cylindrical ring 16, and the thinned inside edge of the lip 15 comes into contact with the outside surface of the cone 3.

In this case also, the ring 16 is inserted into the trough 12 with contact over a large area since the outside surface of the ring is substantially complementary to the corresponding inside surface of the endpiece 1, which inside surface is lined in this case (as in the preceding case) with a layer of rubber 17 that is integrally molded with the cone 3.

In the third embodiment shown in FIGS. 3 and 4, the blades now referenced 18 are no longer disposed in planes perpendicular to the axis X: in this case they lie on radial planes about said axis X.

There may be four such blades 18 lying on planes that are angularly offset from one another by 90° around the axis X.

The trough 12 is thus compartmentalized by the radial blades 18 into trough segments $12_1$ (FIG. 4).

In this construction, the radial flow of the liquid L is braked by the presence of the blades 18 and its circumferential flow is greatly attenuated, but the effect of circumferential flow is not completely eliminated, firstly because of the high deformability of the blades 18, and secondly because there is no sealing in the connection between each blade and the intermediate partition 5.

It can even be seen in FIG. 3 that each blade 18 projects axially beyond the adjacent head $2_1$, but does not project radially over said head, so that the liquid is also free to flow along the inside edge $18_1$ of the axially projecting portion of each blade 18.

A useful advantage of this construction lies in the fact that the blades 18 can be integrally molded with the cone 3, optionally together with filler weights 19 that are provided in the portion of the bottom of the trough 12 that is furthest from said cone 3.

The fourth embodiment shown in FIGS. 5 and 6 differs from the preceding embodiment merely in that a disk 20 overhanging transversely into the working chamber A has been added to the head $2_1$.

The periphery of this disk has a rubber rim 21 of substantially rectangular section fitted thereover, and the rimmed assembly is notched by radial notches 22 suitable for receiving the blades 18 with clearance.

The remaining portions of the rim 21 in the form of circular arcs co-operate with the surrounding inside face portion of the endpiece 1 lined with its lining 17 to define a throttled annular passage 23 for the liquid L.

As is known, the presence of such a passage 23 makes it possible for damping or filtering purposes to make use of a second "column effect" based on the resonance of the liquid contained in said passage, which effect is of the same type as the first "column effect" based on the existence of the throttled passage 6: with appropriate dimensions for said passage 23, it is possible to center the second effect in question on a second oscillation frequency to be filtered or damped.

Also, in a way that is known per se, in each of the above-described embodiments, the center of the rigid intermediate partition 5 is provided with an opening that is closed by a deformable membrane 24 associated with means such as a sheet 25 embedded in said membrane and suitable for limiting the amplitude of the displacements thereof.

The vibrations of said membrane serve to filter certain vibrations of relatively high frequency and relatively low amplitude that are applied to the rod 2 by the engine which is suspended therefrom.

As a result, whichever embodiment is used, a hydraulic anti-vibration mount is made available whose structure and operation can be understood sufficiently from the above.

This mount presents several advantages over previously known mounts, in particular with respect to reducing noise generated by relatively high frequency radial vibration (lying in particular in the range 150 Hz to 400 Hz) of the rod by automatically reducing the corresponding dynamic stiffness of the mount relative to said vibration.

Naturally, and as can be seen from the above, the invention is not limited to the applications and embodiments thereof that are described in detail. On the contrary, the invention extends to any variant, and in particular to:

variants where the flexible blades forming partial obstacles to the flow of liquid L around the central projection and immersed in said liquid are still thin and parallel to the axis X, but are inclined relative to the corresponding radii like the blades of a turbine;

variants in which the mean surfaces of said blades are curved instead of being plane;

variants in which said blades are constituted by walls of cellular material (foam) having open porosity; and variants in which the blades in question are constituted by bulk shavings or the like bonded to the walls of the trough 12, in particular by gluing.

We claim:

1. A hydraulic anti-vibration device for disposing between two rigid elements for the purposes of damping and connection, the device comprising: a rigid endpiece annular about a substantially vertical axis and a rigid stud coaxial with said endpiece, the endpiece and the stud being suitable for securing to respective ones of the two rigid elements to be connected together; an annular wall made of elastomer that withstands axial compression and that is interposed between the endpiece and the stud; a flexible and watertight membrane carried by the endpiece and co-operating with the endpiece, the stud, and the annular wall to delimit an enclosure; an intermediate rigid partition carried by the endpiece and dividing the inside of the enclosure into two chambers, a working chamber adjacent to the wall, and a compensation chamber; a throttled passage putting the two chambers permanently into communication with each other; and a mass of liquid filling both chambers and the throttled passage, and in which, in addition, the stud is disposed inside the working chamber and constitutes a head of a suspension rod itself disposed coaxially with the annular endpiece and inside a bottom portion of said endpiece, the annular wall being downwardly flared and then returning upwards inside a bottom annular portion of the working chamber, the device being characterized in that at least a bottom of the bottom annular portion of the working chamber is provided with at least one flexible blade-like obstacle forming a relatively thin deformable web with opposite faces immersed in the liquid in the working chamber.

2. A hydraulic anti-vibration device according to claim 1, characterized in that the blade-like obstacle is constituted by a plurality of transverse parallel blades extending inwardly from a common cylindrical ring made of elastomer and forming together therewith an annular block whose outside shape is complementary to the shape of the bottom annular portion (12) of the working chamber in which it is received.

3. A hydraulic anti-vibration device according to claim 1, characterized in that the blade-like obstacle is constituted by a single annular lip extending an elastomer cylindrical ring inwardly.

4. A hydraulic anti-vibration device according to claim 1, characterized in that the blade-like obstacle is made up of a plurality of thin webs (18) extending parallel to the vertical axis of the device and integrally molded with the annular wall (3).

5. A hydraulic anti-vibration device according to claim 4, characterized in that the thin webs extend along radial planes of the device.

6. A hydraulic anti-vibration device according to claim 1, characterized in that the stud is secured to a disk overhanging radially into the working chamber (A) and co-operating with the surrounding portion of the annular endpiece to delimit a throttled passage for the liquid.

7. A hydraulic anti-vibration device according to claim 6, characterized in that the periphery of the disk is notched radially by notches suitable for surrounding the various thin webs with clearance.

8. A hydraulic anti-vibration device according to claim 1 wherein the downwardly flared annular wall is frustoconical shaped.

* * * * *